United States Patent [19]

Le Brun, Jr.

[11] 3,958,708
[45] May 25, 1976

[54] OVERSIZED SAFETY CAP

[75] Inventor: Michel A. Le Brun, Jr., Sebastopol, Calif.

[73] Assignee: Sunbeam Plastics Corporation, Evansville, Ind.

[22] Filed: May 5, 1975

[21] Appl. No.: 574,790

[52] U.S. Cl. ................................ 215/216; 215/219
[51] Int. Cl.² ................. B65D 55/02; B65D 85/56; A61J 1/00
[58] Field of Search ............... 215/9, 214, 216, 219, 215/220

[56] References Cited
UNITED STATES PATENTS

| | | | |
|---|---|---|---|
| 3,854,622 | 12/1974 | McKirnan | 215/216 |
| 3,868,036 | 2/1975 | Wittwer | 215/219 |
| 3,888,373 | 6/1975 | Gach et al. | 215/214 |
| 3,888,375 | 6/1975 | Gerk | 215/219 |

*Primary Examiner*—George T. Hall
*Attorney, Agent, or Firm*—Henry K. Leonard

[57] ABSTRACT

A safety cap for sealing a container is disclosed. The cap is adapted to a container having a sidewall and annular upper shoulder extending to a neck portion that is threaded. In the vicinity of the neck portion is a cam member having a lug recess in the vicinity of the eccentric portion of the cam.

The cap comprises an inner cup member with an integral continuous sidewall for sealing the container. On the inner cup member's interior surface, threads are formed to mate with the threads on the container. The sidewall has at least one downwardly projecting lug adapted to contact the recess on the cam member when the cap is in its sealing position. Alternatively, the inner cup member can include an inner cup with threads and a middle cup with lugs.

Connected to the inner cup member or molded in one piece is an over cup that has a diameter equal to the span of an adult's hand. This cup is located so that when a force is exerted against it, it transversely deforms and translates the force to the inner cup member. The inner cup member in turn transversely deforms to disengage the projecting lugs from the lug recess on the cam member.

8 Claims, 10 Drawing Figures

OVERSIZED SAFETY CAP

BACKGROUND OF THE INVENTION

Producers and distributors of chemicals that are harmful to humans when not properly used take every precaution they can to protect children from exposing themselves to the chemicals. For this reason, there are several patents on child-proof caps which prevent a child from opening a container. For example, U.S. Pat. Nos. 3,706,401 and 3,747,807 describe a child-proof cap for aerosol cans. U.S. Pat. Nos. 3,685,676 and 3,770,153 disclose safety closures for containers of substantially different configuration than an aerosol can.

It is this last group of containers which is the primary concern of the present invention, although it can also be used as a closure for an aerosol can. The last-two-mentioned patents are further described.

In U.S. Pat. No. 3,685,676, the cap disclosed is a dual cap with an outer cup rotatably secured to an inner cup having threads on its inner surface. This cap is removed from the container by pushing inwardly in the center of the top of an outer cup, which in turn flexes upwardly, exposing the depending sidewalls of the inner cup. The inner cup can then be grasped to be unscrewed from the container opening. The force necessary to push the outer cup outwardly is beyond the strength of a child.

On the other hand, U.S. Pat. No. 3,770,153 discloses a cap formed into a unitary body. That is, the outer cup and the inner cup are one structure and not rotatably secured to one another. The inner cup has threads on its inner surface and the outer cup has lugs which engage first a cam surface and then lug recesses on the cam. The inner cup is able to be screwed down as the lugs of the outer cup ride along the cam surface and then fall into the lug recesses. When the cap is to be removed, the outer cup must be squeezed or deformed so that the lugs project from or move out of their lug recesses onto the cam surface. The outer cup is sufficiently stiff so that a child cannot deform it. Additionally, the inner cup must also be significantly stiff so that it does not deform so much that is is in fact not sealing the container opening.

The present invention, however, will illustrate and describe a child-proof cap that does not require adult force to remove it from a container, but only requires the person who opens the container to have adult-sized hands. This feature becomes extremely important when an adult who has arthritis wishes to open a container with a child-proof cap. Another embodiment of the invention will illustrate that the inner cup does not have to be substantially stiff, and, the neck portion on the container can be significantly thinner than before. An alternate embodiment will indicate a child-proof cap resulting in a saving of approximately 50% of the material in the outer cup.

SUMMARY OF THE INVENTION

According to the present invention, a unitary safety cap is disclosed. The cap is a closure member of a container which has an integral bottom, continuous sidewall and annular upper shoulder extending up to the neck portion. The shoulder has a cam shape with at least one lug recess in the vicinity of its most eccentric portion. Adjacent to the opening at the end of the neck are external threads.

The cap has an inner cup member with threads on its surface and one or more lugs projecting down from continuous sides which are integral with its top. An over cup member may be formed into one piece with the inner cup member or otherwise connected to it. The over cup member has a diameter larger than the span of a child's hand, so that a child cannot grasp it. When an adult wishes to open the container, he presses inwardly at predetermined places on the overcap's sidewalls. This pressure is transferred to the inner cup, which deforms. As a result, the lugs move out of or disengage from the lug recess onto the cam member of the container.

The inner cup member (or means) may be made up of two members. The first one, closure cup, will have threads to mate with the threads of the container. The second member, middle cup, will be larger than the first one, and have lugs which project down from it.

Several refinements to either of the two basic embodiments mentioned above are possible. First, the over cup member can have drain holes in it to prevent it from being used as a drinking cup. Also, supplementary means such as ribs can be secured either to the inner surface of the over cup or the external surface of the inner cup member. They may also serve as reinforcements for either the over or the inner cup. Further, the inner cup can have a depending central plug to reinforce the spout. Additionally, the over and middle cups may not have a continuous sidewall, but only a portion of one in the vicinity where the pressure is to be applied.

A process for making these caps is also disclosed. Simply, the process involves thermoforming a polyolefin sheet into a seamless safety cap. Specifically, sufficient heat is supplied to thermoform the polyolefin sheet by vacuum-forming and deep-drawing to form the cap. Alternatively, the process of making the cap may be through solvent-forming. To do this, a solvent flows onto the sheet, making it moldable. The sheet is placed in a mold to form it into a safety cap. Then the solvent is extracted, so that the molded shape becomes permanent.

The safety cap may also be a product made from the process which has steps of forming the inner cup and the over cup. Alternatively, inner, middle and over cups can be formed. In some cases, it may be desirable that the over cup be connected in a separate step to a prefabricated inner and middle cup.

DESCRIPTION OF THE PREFERRED EMBODIMENTS

Figure 5:
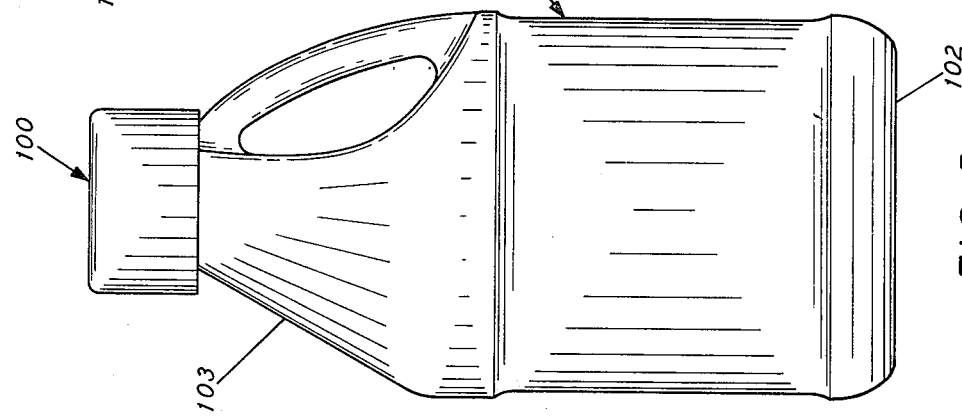
FIG. 5 is elevation view showing cap functioning as a closure for a bottle.
Figure 1:
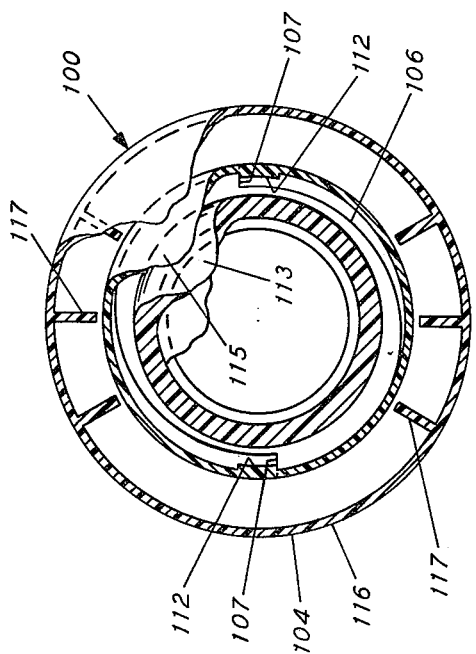
FIG. 1 is a plan view of the invention. A portion of the top of the cap is cut away to more clearly illustrate its components.
Figure 2:
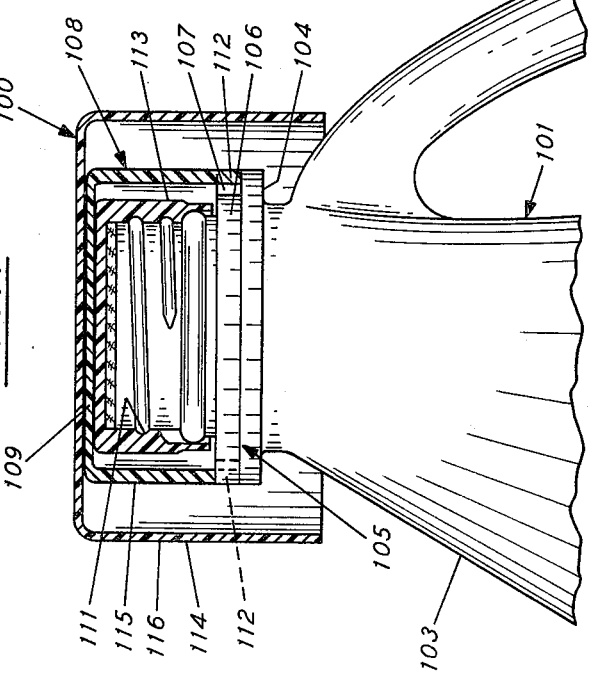
FIG. 2 is an elevation view of the cap. It is also cut away so as to more clearly expose its components.
Figure 7:
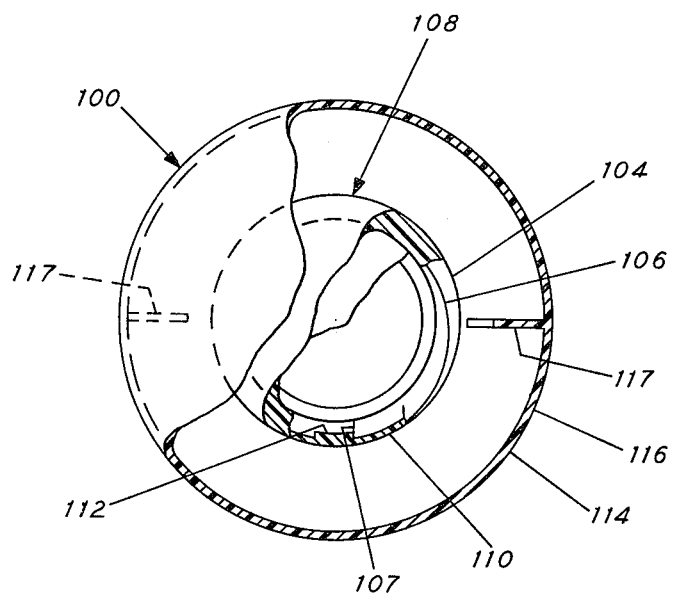
FIG. 7 is a plan view partially in section of the embodiment illustrated in FIG. 6.
Figure 6:
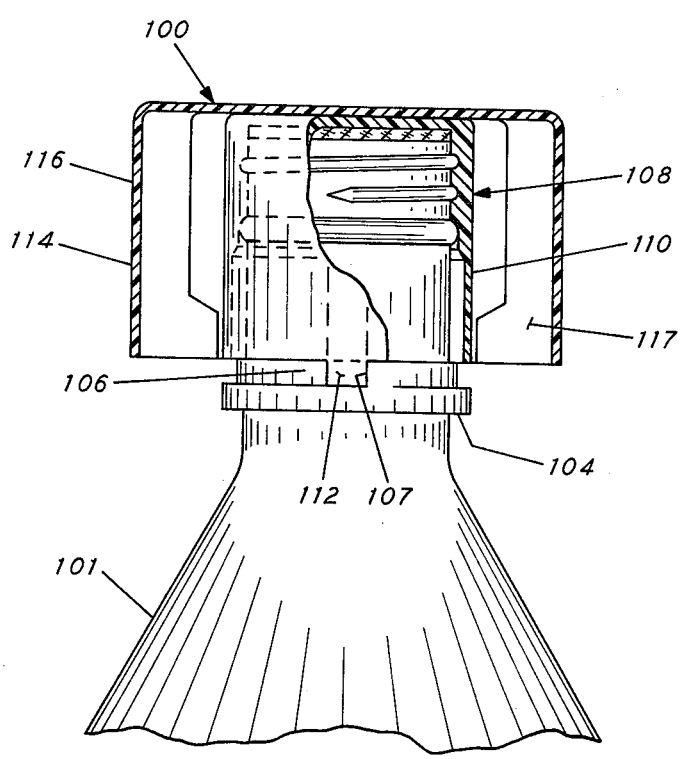
FIG. 6 shows an elevation view partially in section of an embodiment of the invention having two interconnected cups. They fit over a bottle as configured in the drawing.

The invention—safety cap 100—is illustrated in FIGS. 1 and 2. The container 101, FIG. 5, which it seals has an integral bottom 102, a continuous sidewall 103 and an annular upper shoulder 104 extending up to a neck portion 105. Shoulder 104 also forms a cam 106 with at least one lug recess 107 in the vicinity of its eccentric portion. The neck portion forms the opening to the container and includes threads formed adjacent to the upper end opening.

Cap 100 has an inner cup member or means 108, FIGS. 1 to 7, for sealing the container. It includes top 109 integral with continuous depending sidewall 110, FIGS. 6 and 7. A portion of this sidewall has threads 111 formed thereon which mate, or are adapted to mate, with the neck threads of the container. At least one downwardly projecting lug 112 is formed on another portion of the depending sidewall. In FIGS. 1 to 4, two are shown. They are adapted to contact lug recesses 107 on cam member 106 of the contaner when the cap is adjacent to its sealing position on the neck. The lower portion of this sidewall extends sufficiently below cam member 106 and laterally spaced from neck portion 105 to permit transverse deformation of the sidewall. This permits the projecting lugs to clear lug recess 107 for disengagement of the safety cap 100 of the container, FIGS. 3 and 4.

An over cup 116 is connected or integrally formed with inner cup member or means 108. The over cup is larger in diameter than the span of a child's hand so that the child cannot remove the cap. Over cup 116 has a top and integral side 114. The side is flexible enough so that when a force or pressure is exerted or applied to it at predetermined positions (e.g. pressure is applied at approximately 90° from lugs 112) the inner cup member and the over cup are transversely deformed. This allows the lugs to disengage from recesses or indentations 107 of cam member 106.

In some cases, it may be desirable to use existing caps such as the one disclosed in U.S. Pat. No. 3,770,153. In this case, FIGS. 1 and 2, over cup 116 can be formed or connected to the prefabricated pair of cup members (inner or closure cup and middle cup) by a bonding technique such as one of those described below. These members are constructed and arranged so that inner (or closure) cup 113 has a top integral with continuous depending sidewall. This sidewall has threads formed on its inner surface and, as before, is adapted to mate with the neck threads of container 101.

Figure 9:
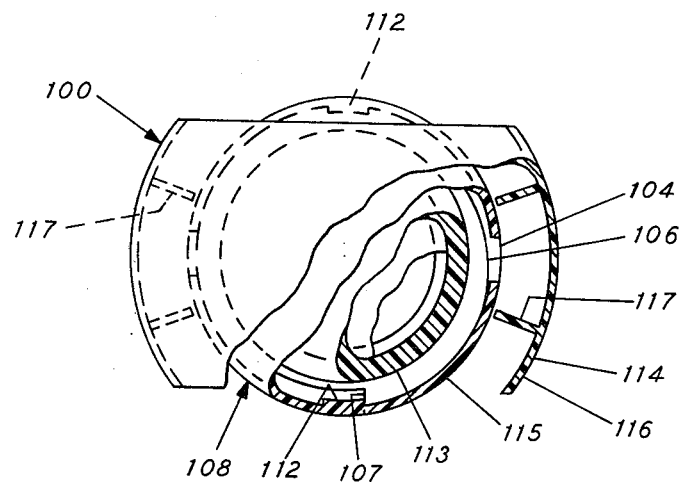
FIG. 9 is a plan view partially in section of the embodiment of FIG. 8.
Figure 8:
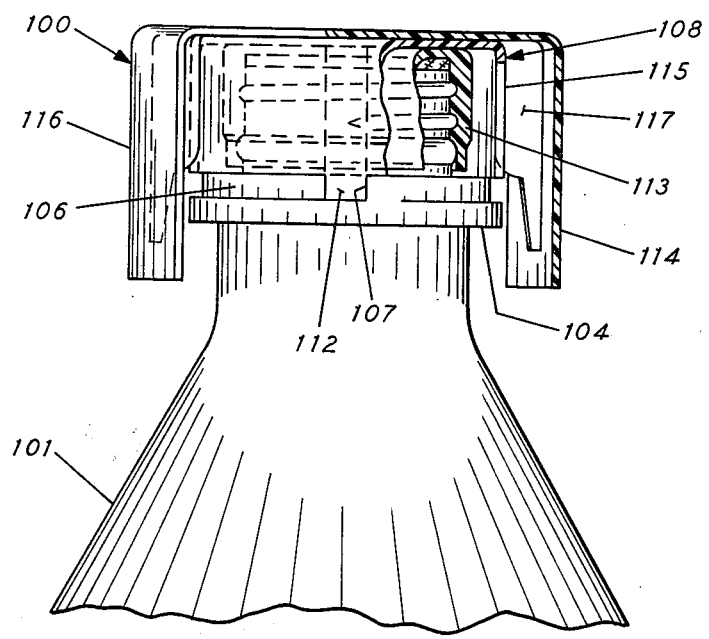
FIG. 8 shows an elevation view partially in section of an embodiment of the invention. In this Figure, the over cup and the middle cup do not have a continuous sidewall.

Further, middle cup 115, which has a top, is connected or formed to the inner cup. This member has a continuous depending wall with at least one downwardly projecting lug 112 formed on it. It is noted here that this middle cup, as well as the over cup, does not necessarily have to have a continuous side. It may be desirable to have them formed as shown in FIGS. 8 and 9. There, of course, is a corresponding savings in the cost of material used. Also cap 100 requires less force to remove it, since there is less material to deform.

The projecting lug formed on the sidewall of the middle cup is adapted to contact indentation or recess 107 of cam member 106 when inner or closure cup 113 is adjacent to its sealing position on the neck of the container. As illustrated in FIG. 8, the lower portion of the lug is desirably extended sufficiently below the cam member. It is also desirable that sidewall 110 be laterally spaced from the neck portion to permit its transverse deformation. As a result, the projecting lugs are able to clear the lug recesses for disengagement and subsequent unscrewing of the safety cap from the container.

Oftentimes containers holding chemicals are used only a few times. In this case, it is not necessary to have either supplemental means to transfer the force from the over cup to the inner cup, provided the over cup is sufficiently flexible. Nor is it needed to reinforce either the inner cup member or the outer cup. However, if the container is to be opened and closed periodically, such means may be desirable. One form the means can take is one or more ribs 117 located in the area where the pressure is to be applied on the over cup FIGS. 1, 6 and 8. These ribs can be connected to the inner surface of over cup 116. As a result, they transfer the force exerted on them to inner cup member 108. Though ribs were used for illustration purposes, a slug of material, e.g., an elongated cylinder of stiff material, may be as suitable.

In either case, this supplemental means may also function as reinforcement for the over cup. The location of these ribs, however, is not fixed. They may be connected or formed to inner cup member 108 to perform in the same manner. That is, the supplemental means or ribs are connected to the outer surface of the inner cup member so as to transfer the force exerted on the outer cup to the inner cup. They will also assist the inner cup member to resist permanent deformation or fatigue failure due to the repetitious squeezing of the over cup.

Additionally, inner cup member 108 or closure cup 113 can have a depending central (solid or hollow) plug, not illustrated, that mates with the inner surface of the neck portion of the container. The plug reinforces the spout or neck 105 of the container. Consequently, the bottle may be less expensive, since less material is used to form the neck. Also the inner cup member or closure cup is more apt to keep the container sealed, even though the middle and over cups are flexed because the plug reinforces the neck preventing it from deflecting out of shape.

Before passing on to a description of the processes of making the cap, a complete embodiment of the invention will be restated here. First, child-proof over cup 100 includes a first inverted cup-shaped cover 113 for closing the upper end. Threads are formed on a first cup and complementary threads are on the exposed surface of the upper end of the container. These threads are for screwing the first inverted cup onto the open end.

A second inverted cup-shaped cover 115, which is larger in diameter than the first one, may be formed or connected to it. The second cover has a complementary locking element 112 formed or connected to it so as to engage a locking element (comprising lug recesses 107 and cam member 106, FIGS. 1, 6 and 8) in the vicinity of the upper open end of the container.

Figure 3:
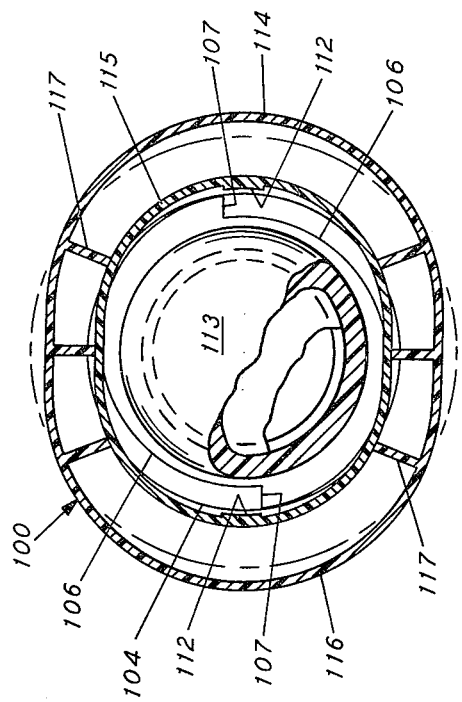
FIG. 3 is a plan view of the cap illustrated in FIG. 1 in a squeezed position.
Figure 4:
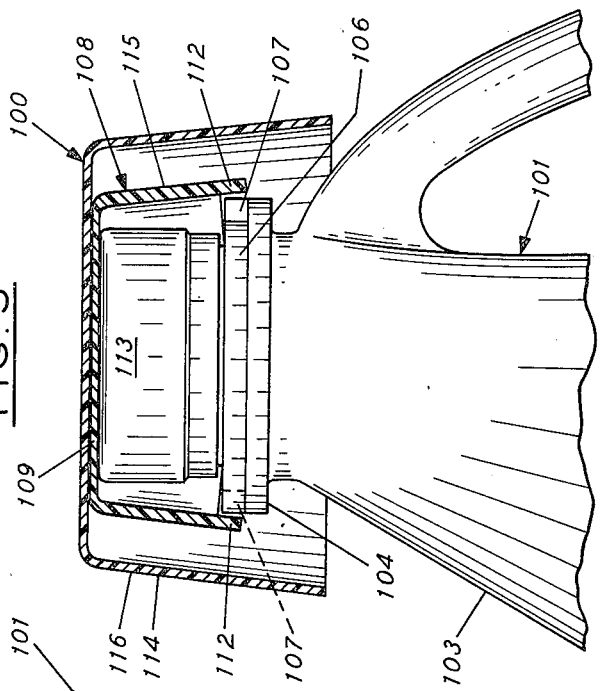
FIG. 4 is an elevation view of the squeezed cap of FIG. 2.

A third inverted cup-shaped cover 116 is connected or formed to the second one so that the complementary locking element on it is disengageable only when the third cover is squeezed by an adult-sized hand at predetermined locations on the third cover, FIGS. 3 and 4.

Additionally, auxiliary means, such as ribs 117, for directing the squeeze applied from the third cup to the second one at predetermined places can be provided. The locking elements of the second cover can then disengage so that the first cover is unscrewable from the upper open end of the container. Holes, forming the means for draining, can be provided in third cup 116 so that it is unusable as a drinking cup when the cap is not sealing a container. This is important because traces of the chemical left in the cap may be swallowed with the drink that could otherwise be placed in it.

The process for making the cap is now described. One way involves thermoforming a polyolefin sheet having a thickness of 20 mils (about 0.5 mm) to 200 mils (about 5 mm), preferably 40 mils (about 1 mm) to 120 mils (about 3 mm) and density between 49 and 106 pounds per cubic foot into a seamless safety cap. Sufficient heat is supplied to thermoform the polyolefin sheet by vacuum-forming and deep-drawing a first cup having threads formed in a wall. The wall is integral with a top and a second cup above and connected to the first cup and having at least one locking element (lug) and exterior wall integral with a top and substantially equal in depth to the wall of the first cup. A third cup is above and connected to the second cup with a wall integral with the top of the cup. Each cup will have a density of 49 to 106 pounds per cubic foot (specific gravity between 0.89 to 1.7) and a major portion of the cup wall means having a thickness between 20 mils (about 0.5 mm) to 200 mils (about 5 mm), preferably 40 mils (about 1.0 mm) to 120 mils (about 3 mm).

The third cup is characterized by being capable of being held only in a hand having the span of an adult hand to screw the first cup onto a container. The container has complementary threads at its open end and a mateable complementary locking means to contact the locking element of the second cup. The complementary means may be a cam near the open end of a container with at least one lug recess in vicinity of the eccentric portion of the cam.

A second process is solvent-forming a safety cap from a wrinkle-free polyolefin sheet having a thickness of 20 mils (about 0.5 mm) to 200 mils (about 5 mm) and preferably 40 mils (about 1 mm) to 120 mils (about 3 mm) at a density between 49 and 106 pounds per cubic foot (specific gravity between 0.89 to 1.7). The process includes flowing solvent onto the sheet to make it moldable; placing the moldable sheet into a mold so that the sheet forms a unitary body having an inner cup means with at least one locking lug. This lug is mateable with a complementary lug recess in a cam near the open end of a container. An over cup member is also formed having the characteristic of being capable of being held in hand only by an adult-sized hand. The exterior wall of each cup has a density of 49 to 106 pounds per cubic foot (specific gravity between 0.89 to 1.7) and a thickness between 20 mils (about 0.5 mm) to 200 mils (5 mm), preferably 40 mils (about 1 mm) to 120 mils (about 3 mm). Finally, the solvent is extracted from the sheet when the predetermined shapes of the inner cup means and the over cup member are obtained.

There are many other different ways of forming the cap, i.e., forming inner cup member 108 (or closure cup 113 and middle cup 115), over cup 116, and ribs 117. Forming is intended to include molding, forging and casting. Each is summarily presented; only one is illustrated. Their details are well known to those skilled in the art; however, several references are mentioned at the end of the description as sources of information if desired.

One is blow molding, a hollow tube of resin called a "parison" is positioned between two mold halves. The mold is then blown by compressed air so that it takes the shape of the mold. There are several ways to form the parison through blow molding: continuous extrusion, intermittent extrusion, neck injection-tube extrusion, injection blow molding, and dip-blow molding.

Figure 10:
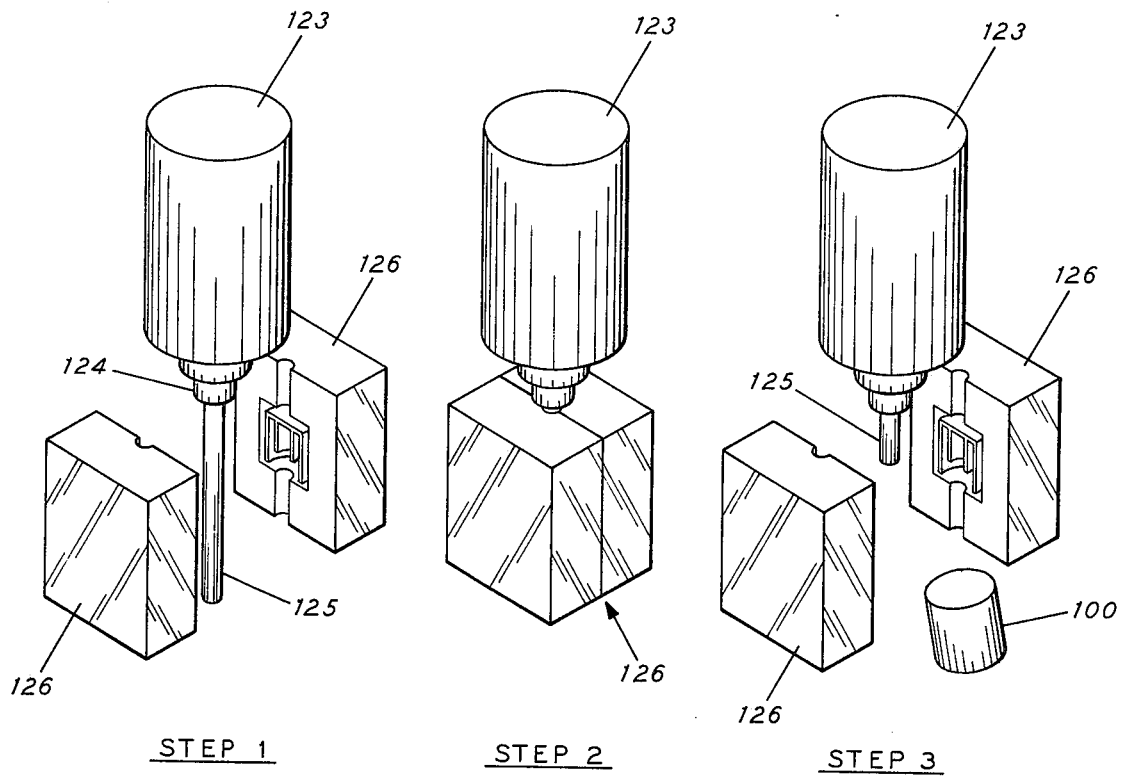
FIG. 10 is a schematic illustration showing the safety cap being formed by intermittent extrusion blow molding.

Intermittent extrusion blow molding is illustrated in FIG. 10. In Step 1, extruder 123 has already accepted pellets of resin and melted them by heat from electrical heaters and the friction of a reciprocating screw within the extruder. When a sufficient amount of melted resin is accumulated in the extruder, die 124 is opened and the melted resin moves through it to form extrusion or parison 125. In Step 2, mold 126 closes and compressed air between 100–150 psi is injected. Then the mold is cooled. In Step 3, the mold opens, and formed cap 100 is ejected and the extruder begins again to accumulate melt. These steps are similar to the other ways of blow molding; although injection molding will be further described.

Injection blow molding is advantageous where there is need for unique design and close control over dimension. The parison is injected into the molding. Then it is expanded or blown by internal pressure, normally compressed air at approximately 15,000 to 25,000 psi. The threaded portion of the cap may be formed by using threaded inserts, collapsible cores, or automatic unscrewing devices. In the first, the insert is manually removed after the mold is taken off. In the second, collapsing cores are wedge-shaped parts which collapse inwardly to clear the threads as the mold is removed. However, cooling of the core is required. The third, automatic unscrewing mold, employs mechanisms that either rotate the cavity of the core to free the threaded section. On the other hand if a melted or plasticated thermoplastic is used, it is injected or forced into a cooled mold. After chilling, it is removed when in the solid state.

Alternatively, it is possible to cast certain types of plastics, depending on the type chosen. In particular, if an acrylic ester is used, it is poured into a mold, which is preferably metal. Then it is cured under heat — that is, placed into an oven or autoclave up to 200°F, with or without pressure. Subsequently, the mold is cooled.

Casting of a thermoset is also possible. For instance, an open container mold is used here. And, since an epoxy is generally used, parting agents must be applied to the mold surface because of the epoxy's strong adhesion to it. Of course, if other thermosets are used, the above steps are appropriately varied.

Another way adaptable to form the cap is compression molding. Simply, it involves forming of thermosetting materials placed in an open mold by heat and pressure. One advantage of this method is that concentricity of parts is better than in any other thermoset molding or forming techniques. This method is preferable when a thermoset cap having a plug to reinforce the neck portion of the container is desired.

Yet another method is transfer molding. Briefly, a heated mold is closed first, then the material is heated in a pot which is part of the heated mold from where it flows into the closed cavities of the mold by a ram. This method is faster, since the mold is heated. Also, flash is minimal because the mold is closed.

Mechanical forming or forging may also be used. However, because of the requirement for threads, mechanical forming would involve at least two steps, one in which the cap is stamped out and the second involving forming threads on the inner surface of the inner cup. In the case of forging, a blank cut from an extrusion is placed into an oven or other heating system, after which a die is inserted into the heated material. After the predetermined shape of the safety cap is achieved, the forging is removed from the die. This particular method is adapted to forming thick parts. In some instances where the safety cap is to be used in a rough environment, the use of a very stiff inner cup of the cap is desirable.

Another popular method is using thermoforming techniques. This method was generally outlined above and will be further discussed here. There are at least 17 basic types, broken down into three classes.

First, there is the general-purpose type. It uses drape and vacuum forming. In this case, the vacuum-forming machine consists of the single-side heating, stationary platen for mounting of molds and a drape-type clamp frame. Heat-softened plastic is stretched over the positive mold or sealed against the negative mold to form the cap.

The second type is a sheet-bed machine consisting of a shuttle-type or rotary-type machine. It is by far the most popular type of the thermoformers. It is designed to utilized all forming techniques and capable of holding high pressures between upper and lower platens. Each platen contains air and vaccum, which may be controlled. The platens are moved rapidly and are capable of locking to prevent separation when air pressure is introduced between the molds. Heating is ordinarily through far-infrared electric rods which heat the sheets from each side.

The third type is roll-fed machines. These machines are very fast and are commonly used for the production of thin-walled products such as my invention. They have a roll station, heating banks, form station, cooling station and trim station.

For further information on thermosetting as well as the other methods such as those mentioned above, and those for forming other plastics not specifically mentioned like reinforced plastic, a review of the current edition of *Modern Plastics Encyclopedia*, No. 10A, published annually by McGraw-Hill, is suggested. Two other references are: *Plastic Sheet-forming*, by Robert L. Butzko, Reinhold Publishing Corporation, 1958, and *Polypropylene*, by Theodore O. J. Kresser, also published by Reinhold, 1960.

As mentioned earlier, cups 108, 113, 115, and 116 can be fabricated in one complete unit or separately. In either case, they are connected together; in the former the connection is accomplished by forming them integrally; in the latter case, they are otherwise connected.

For example, in the latter case, the separate units may be connected together by adhesive bonding or induction bonding. Induction bonding is based on the principle that magnetic materials dispersed in a thermoplastic matrix of one of the abutting cups develop heat when subjected to high-frequency induction sources. Another form of induction bonding is magnetic heat sealing. Such sealing utilizes radio frequencies of magnetic fields to melt a thermoplastic layer (between the units to be connected) containing heat-generating powder. A fourth way is mechanical fastening. Some other suggested ways are thermo heat sealing and welding. Each has its benefits in certain cases, as well as its detriments. A man skilled in the art, however, would choose the type of connection that is economically best for him.

The foregoing presents and describes several embodiments of the invention. It is not intended to limit or otherwise narrowly construe the invention. The only limitations intended on the disclosed invention are those included in the appended claims.

What is claimed is:

1. A safety cap forming a closure member for a container having an integral bottom, continuous sidewall and annular upper shoulder extending up to a neck portion whose upper end forms the opening to said container, said neck including thread means formed thereon adjacent to said upper end opening, a cam member having at least one recess adjacent to the eccentric portion of said cam member constructed on said neck portion in the vicinity of said shoulder and the lower end of said neck threads;

said cap having an inner cup means for sealing said container, including a top integral with a continuous depending sidewall means, one portion of said depending sidewall means having threads formed thereon adapted to mate with the neck threads of said container, at least one downwardly projecting lug formed on another portion of said depending sidewall means adapted to contact said cam member when said threaded portion of said cap is adjacent to its sealing position on said neck, and a lower portion of said depending sidewall means extending sufficiently below said cam member and laterally spaced from said neck portion to permit said projecting lug portion to clear said recess of said cam member for disengagement of said safety cap from said container; and an over cup member, larger in diameter than the span of a child's hand so that a child is unable to open said safety cap, substantially surrounding said inner cup means having a top and integral side;

said over cup member connected to said inner cup means, so that when a force is exerted against said over cup member to said inner cup means at predetermined positions, said inner cup means and said over cup member are transversely deformed to disengage said projecting lug portion from said recess of said cam member.

2. The safety cap forming a closure member for a container of claim 1 wherein said inner cup means for sealing said container comprises a pair of concentric cup members, wherein:

said pair of cup members is constructed and arranged so that a closure cup has a top integral with a continuous depending sidewall, said depending sidewall having threads formed on the inner surface of said sidewall adapted to mate with neck threads of said container, and a middle cup member having a top formed to said closure cup, said middle member having a depending sidewall with at least one downwardly projecting lug portion formed on said sidewall adapted to contact said recess of said cam member when said closure cup is adjacent to its sealing position on said neck, the lower portion of the sidewall of said middle member extending sufficiently below said cam member and laterally spaced from said neck portion to permit transverse deformation of the sidewall of said depending member to permit said projecting lug portion to clear said recess of said cam member for disengagement of said safety cap from said container.

3. A safety cap forming a closure member for a container of claim 1 wherein said inner cup means comprises a single inner cup with threads on one portion of said sidewall and said lug on another portion of said sidewall.

4. A safety cap forming a closure member for a container of claim 1 wherein said over cup includes supplemental means for transferring force exerted to said over cup member to said inner cup means, said supplemental means connected at least on one end to the inner surface of said over cup, wherein said supplemental means may also serve as reinforcement to said over cup member to resist permanent deformation and fatigue failure due to repetitious squeezing of said over cup means.

5. A safety cap forming a closure member for a container of claim 1 wherein said over cup member includes a supplemental means for transferring force exerted against said over cup member to said inner cup means, said supplemental means connected at least on one end to the outer surface of said inner cup means whereby said supplemental means may also assist said inner cup means to resist permanent deformation and fatigue failure due to repetitious squeezing of said over cup member.

6. A safety cap forming a closure member for a container of claim 1 including means for draining said over cup member so that said over cup member cannot be used as a drinking cup when said safety cap is removed as a closure for the container.

7. A safety cap forming a closure member for a container of claim 1 wherein said inner cup means has a depending integral plug means constructed and arranged to mate with the neck of said container so that said neck portion is reinforced by said plug means.

8. A child-proof over a cap for container having a cylindrical body, with an integral bottom and an open upper end, complementary thread means on said upper open end of said container, and a locking element connected to said container in the vicinity of said container's upper open end, said child-proof cap comprising:
   a first inverted cup-shaped cover for closing said upper open end of said container;
   thread means on said first inverted cover for screwing said first inverted cup-shaped cover onto said complementary thread means on said upper open end of said container;
   a second inverted cup-shaped cover, larger in diameter than said first inverted cover, wherein said second inverted cover is connected to said first inverted cover;
   a complementary locking element on said second inverted cup-shaped cover so as to engage said locking element in the vicinity of said upper open end of said container;
   whereby when said second inverted cover is squeezed at predetermined places said complementary locking element of said second inverted cover and the locking element of said upper open end are disengaged so that said first inverted cover is unscrewable from said upper end;
   a third inverted cup-shaped cover connected to said second inverted cover so that said complementary locking element of said second inverted cover and the locking element of said upper open end are disengagable only when said third cover is squeezed by an adult-sized hand at predetermined locations on said third inverted cover;
   auxiliary means for directing the squeeze of said adult-sized hand applied to said third inverted cover to said second inverted cover at predetermined places, resulting in said complementary locking element of said second inverted cover to disengage the locking element of said container so that said first inverted cover is unscrewable from said upper open end; and
   means for draining said third inverted cover so that said third cup means is unusable as a drinking cup when not used as a cap for said container.

* * * * *